(12) United States Patent
Xie et al.

(10) Patent No.: US 7,286,083 B2
(45) Date of Patent: Oct. 23, 2007

(54) METHOD AND APPARATUS FOR IMPROVING FAULT DETECTION AND EXCLUSION SYSTEMS

(75) Inventors: Gang Xie, Tempe, AZ (US); Shreeram Jambulingam, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 174 days.

(21) Appl. No.: 11/304,470

(22) Filed: Dec. 15, 2005

(65) Prior Publication Data

US 2007/0139263 A1    Jun. 21, 2007

(51) Int. Cl.
    G01S 1/00    (2006.01)
    G01C 21/00   (2006.01)

(52) U.S. Cl. ............... 342/357.02; 342/357.09; 701/207; 701/213

(58) Field of Classification Search ........... 342/357.02, 342/357.09; 701/207, 213
    See application file for complete search history.

(56) References Cited

U.S. PATENT DOCUMENTS

| | | | |
|---|---|---|---|
| 6,166,683 A * | 12/2000 | Hwang ................ | 342/357.04 |
| 6,411,892 B1 * | 6/2002 | van Diggelen ............ | 701/207 |
| 6,799,116 B2 * | 9/2004 | Robbins .................... | 701/214 |
| 2005/0052319 A1 * | 3/2005 | Hatch et al. ........... | 342/357.02 |
| 2006/0074558 A1 * | 4/2006 | Williamson et al. ...... | 701/213 |
| 2007/0096977 A1 * | 5/2007 | Lillo et al. ............ | 342/357.02 |
| 2007/0139263 A1 * | 6/2007 | Xie et al. ............. | 342/357.02 |

* cited by examiner

*Primary Examiner*—Thomas H. Tarcza
*Assistant Examiner*—Harry Liu
(74) *Attorney, Agent, or Firm*—Terri S. Hughes

(57) ABSTRACT

A method for improving fault detection and exclusion of a GPS receiver is provided. The method determines pseudo-range measurement residuals of tracked signals, divides the signals into two groups based on whether each signal has a higher or lower probability of being a failure, and estimates a residual bias using only the lower probability group of signals. The method further removes the residual bias from all calculated residuals, and compares each range residual to one of three different thresholds. A tighter threshold is applied to positive residuals of the group of signals with higher failure probability than to the group of signals with lower failure probability. A further tighter threshold is applied to negative residuals of the group of signals having higher failure probability. The method then determines PVT values of the GPS receiver utilizing range measurements of signals whose measurement residual magnitudes are less than their corresponding threshold values.

20 Claims, 5 Drawing Sheets

METHOD AND APPARATUS FOR IMPROVING FAULT DETECTION AND EXCLUSION SYSTEMS

FIELD OF THE INVENTION

The present invention relates generally to Global Positioning System (GPS) navigational systems, and more particularly to fault detection and exclusion systems for use in GPS navigational systems.

BACKGROUND OF THE INVENTION

GPS is a satellite-based radio navigation system. The GPS system is divided into three segments: space, control, and user. The space segment comprises currently a constellation of 24 GPS satellites. The control segment comprises ground stations around the world that are responsible for monitoring the GPS satellite orbits, synchronizing the satellites' onboard atomic clocks, and uploading data for transmission or broadcast by the satellites. The user segment consists of GPS receivers used for both military and civilian applications.

Each GPS satellite, also called space vehicle (SV), broadcasts time-tagged ranging signals and navigation data. A SV essentially provides its signal transmit time and ephemeris to GPS receivers. A GPS receiver extracts the signal transmit time from its code tracking loop and compares it with the signal reception time determined by the receiver clock. Satellite clocks are synchronized with the GPS time, while the receiver clock, which does need to have good short term stability, is not. A difference between the receiver clock time and GPS time is called a receiver clock bias.

A time difference, between the signal transmit time and the signal reception time, is an apparent transit time of the signal from the satellite to the receiver. A pseudorange is the measured apparent transit time multiplied by the speed of light in a vacuum, which needs to account for the receiver clock bias, ionospheric delay, and other measurement corrections. If corrected pseudorange measurements from at least four satellites in view are available at a single measurement epoch (period or time interval, typically every one second), a receiver three-dimensional position and clock bias can be determined. Typically, the GPS receiver is configured to compute a delta position with respect to a previously obtained position and then update the position solution for the current epoch.

In addition to the ionospheric delay, the GPS ranging signals transmitted from a satellite to a receiver are subject to a variety of other noise and error sources, either intentionally or unintentionally, such as ephemeris data error, multipath, and jamming. Reflection is one type of multipath, where a GPS receiver only tracks a reflected signal while its direct signal is blocked, for example, by a building. Signal ranging errors are eventually turned into a GPS positioning error. In some urban canyon environments, multipath and reflections can compound to become a severe problem to GPS navigational systems.

In order to achieve a certain high level of position accuracy and integrity, GPS receivers usually implement a failure detection and exclusion (FDE) system to detect range measurement failures as quickly as possible within a relatively small probability of false detection. If a failed measurement is detected, it will not be used in the computation of the GPS position, velocity and time (PVT) determination at the current epoch.

The pseudorange measurement residual test is widely used in FDE systems or units of GPS receivers to detect pseudorange measurement failures. A pseudorange measurement residual is a difference between a corrected pseudorange measurement and a predicted range from the satellite to the receiver. The residual test computes the residuals and then compares them with a predetermined residual threshold. If the magnitude of a residual is larger than the threshold value, then the corresponding pseudorange measurement is detected as a failure; otherwise, the measurement passes the test. Only those that pass the residual test is used in the PVT determination. The tighter the threshold, the more effective the test is in detecting failures; however, a too tight threshold can result in an unfavorable increase in false detection probability. Therefore, the threshold should be properly valued. There are basically two types of pseudorange residual tests, i.e., pre-update and post-update pseudorange residual tests.

The post-update pseudorange residual test first updates the receiver position using all measurements, and then calculates the residuals based on the updated receiver position. If the measurements do contain some failures that are to be detected, then both the updated position and the calculated residuals are erroneous due to utilizing the failed measurements. Meanwhile, if there are four or fewer pseudorange measurements available, the system of equations, which is typically solved by a least-squares method to determine the three-dimensional receiver position and time, is not over-determined. Thus, the residuals based on the newly updated position are zeros theoretically. Therefore, this test is incapable to detect measurement failures when there are fewer than five satellites in view, which is generally the case in severe urban canyon environments.

The pre-update pseudorange residual test calculates residuals based on a previously obtained receiver position, detects and excludes failures, and then updates the position by utilizing good measurements only. Therefore, unlike in the post-update residual test, this updated position should not be jeopardized by failed measurements. The test is very useful if the pre-update receiver position is quite close to the current true position, and can still be functional even in cases when only four or fewer satellites are in view. Since possible receiver movement and clock frequency drift during one epoch can introduce a bias to the calculated residuals, typically GPS receivers employ some approaches to remove this residual bias. These approaches, however, utilize all available measurements, including potentially erroneous measurements, which reduce the effectiveness of the residual test.

Accordingly, there is a need for addressing the problems noted above and others previously experienced.

BRIEF DESCRIPTION OF THE DRAWINGS

The present invention is illustrated by way of example, and not limitation in the accompanying figures, in which like references indicate similar elements, and in which.

Figure 1:
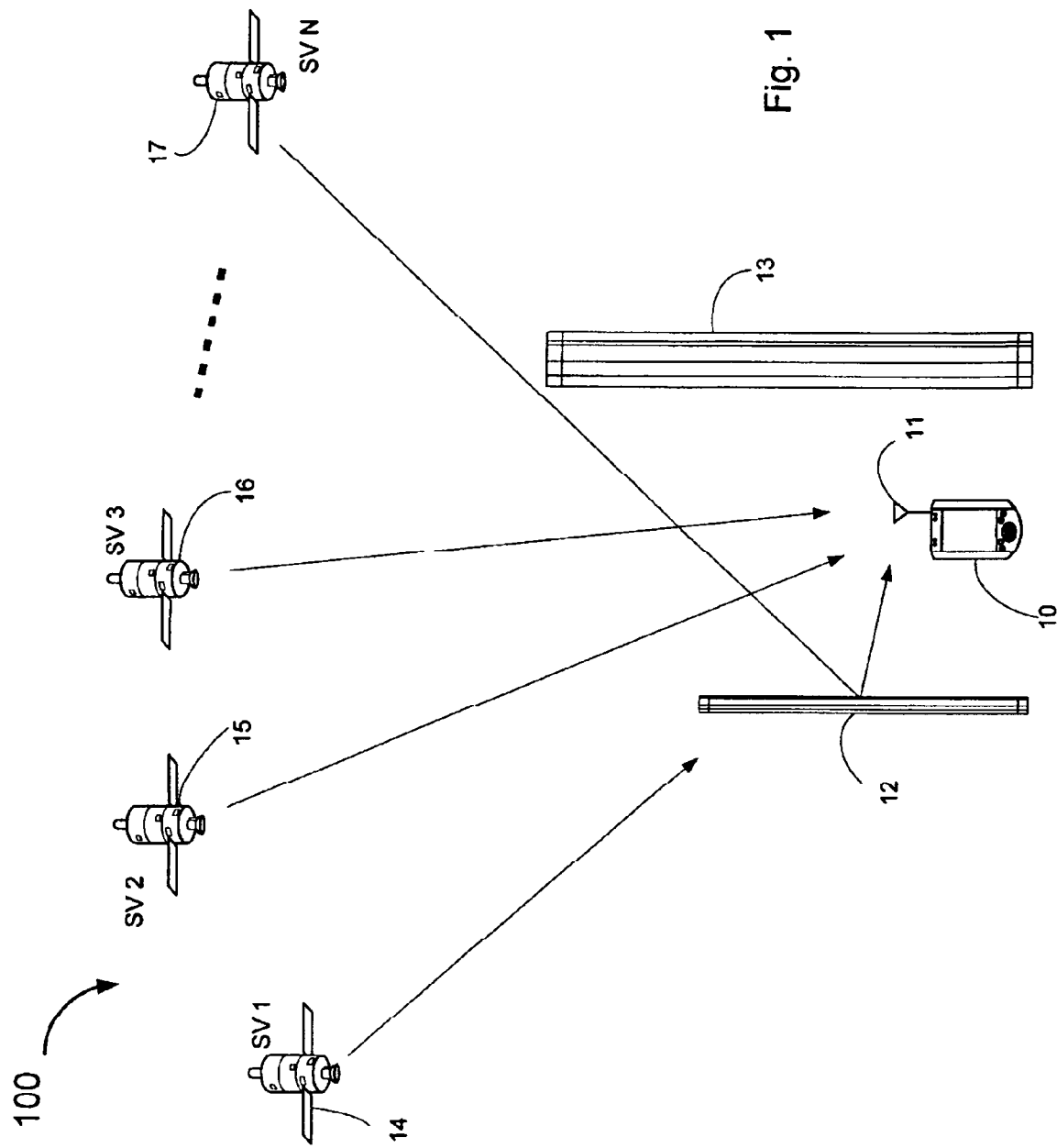
FIG. 1 is an example communication network illustrating a GPS receiver configured to track orbiting space vehicles.

Illustrative and exemplary embodiments of the invention are described in further detail below with reference to and in conjunction with the figures.

DETAILED DESCRIPTION OF THE INVENTION

A method for improving fault detection and exclusion systems of GPS receivers is provided. The method comprises accurately detecting pseudorange failures to provide an effective pre-update pseudorange measurement residual test of tracked signals.

In one embodiment, the method divides all tracked signals and their corresponding measurements into two groups. A first group comprises tracked signals selected via a measurement residual test at a prior epoch. A second group comprises tracked signals that failed the selection by the residual test at the prior epoch or that are newly acquired. Signals of the first group have a lower probability of being detection failures than those signals of the second group.

In another embodiment, the method calculates a residual bias using only signals of the first group. As the second group signals have a relatively high probability of being failures, the calculated residual bias has a substantially higher integrity than a residual bias using all tracked signals. After subtracting the residual bias, measurement residuals acquire a substantially higher integrity, and therefore tighter residual thresholds are applied for the same probability of false detection.

In still another embodiment, the method compares the measurement residuals of tracked signals to predetermined thresholds, based on tracked signal group affiliation. A first threshold, which corresponds to the first group of tracked signals, is greater than a second threshold which corresponds to tracked signals of the second group with non-negative measurement residuals. Furthermore, a third threshold for the second group of tracked signals that have negative measurement residuals is smaller than the second threshold.

The present invention also provides an apparatus of a GPS receiver which comprises a signal tracking and data decoder unit to track time-tagged ranging signals broadcasted by SVs, and determine range measurements between the GPS receiver and the SVs, and a failure detection unit configured to divide the track time-tagged ranging signals into two groups of tracked signals.

In a further embodiment, the failure detection unit calculates a residual bias using only signals of the first group, which have a relatively low probability of being signal failures. With the second group signals having relatively higher probability of being failures, the calculated residual bias has a substantially higher integrity than a residual bias using all tracked signals.

In still another embodiment, the failure detection unit compares the measurement residuals of tracked signals to predetermined thresholds, based on tracked signal group affiliation. A first threshold, which corresponds to the first group of tracked signals, is greater than a second threshold which corresponds to tracked signals of the second group with non-negative measurement residuals. Furthermore, a third threshold for the second group of tracked signals that have negative measurement residuals is smaller than the second threshold.

Turning now to the drawings, and particularly to FIG. 1, a communication network 100 is illustrated and generally designated at 100. Communication network 100 comprises a GPS receiver 10 having an antenna 11, used to track a plurality of orbiting SVs or satellites SVi, with integer i=1, 2, . . . , N. To avoid confusion, a satellite SVi is assumed to be tracked by an internal signal channel with index i of GPS receiver 10, and for sake of simplicity only four satellites SV1, SV2, SV3 and SVN 14, 15, 16, and 17 are shown in FIG. 1.

Communication network 100 is shown with environmental structures 12 and 13 positioned in direct paths of ranging signals emitted by satellites SV1 14 and SVN 17 and received or captured by antenna 11. Hence, in urban canyon environments, for example, ranging signals are subject to obstacles and multipath, such as reflections. Multipath introduces systematic error into the GPS measurements and adversely affects the PVT determination. Multipath conditions are difficult to predetermine at any given location. This situation is made substantially difficult and complex in a kinematical application where a changing location of GPS receiver 10 may result in dynamic changes in the effects of multipath.

Figure 2:
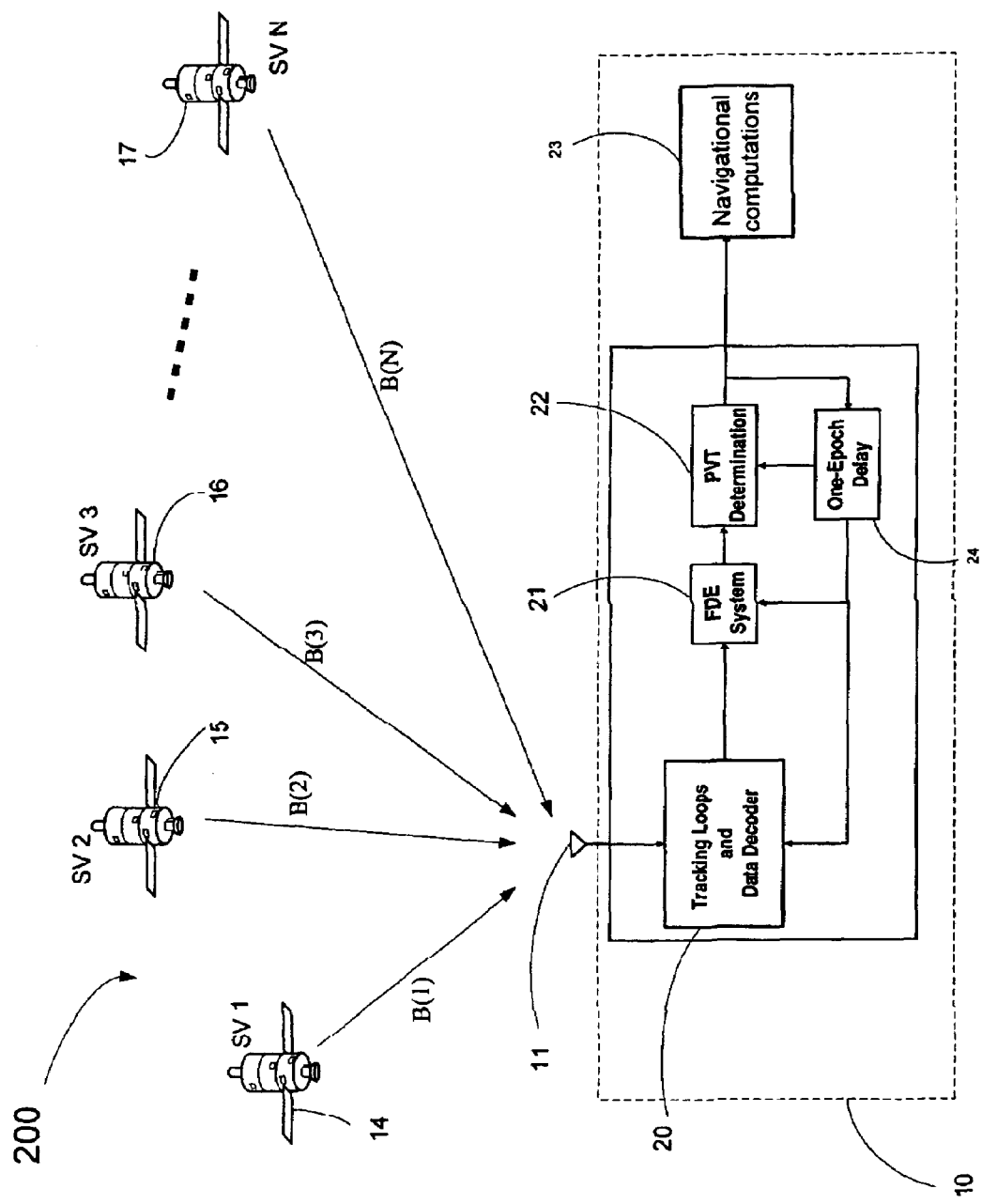
FIG. 2 is a block diagram illustrating internal units of the GPS receiver of FIG. 1.

Now referring to FIG. 2, a block diagram 200 illustrates tracking and computational components of GPS receiver 10. In GPS receiver 10, a tracking loops and data decoder unit 20 is configured to track time-tagged ranging signals and decode navigation data B(i) broadcasted by each satellite SVi, and to extract a signal emission (or transmit) time, $t_e(i)$ from broadcasted signals B(i) of satellite SVi. Tracking loops and data decoder unit 20 sends pseudorange measurements to a FDE system or unit 21, which in turn transmits measurements that have not been excluded to a PVT determination unit 22. The PVT determination unit 22 determines PVT values of GPS receiver 10, typically with least-squares methods, Kalman filtering algorithms, or the like. Once determined, the PVT values of the GPS receiver 10 are communicated to other navigational systems to support appropriate navigational evaluations. The determined PVT values of the GPS receiver 10 are also delayed by one-epoch and fed back to tracking loops and data decoder unit 20, to FDE unit 21 and to PVT determination unit 22 to assist their functions at a next epoch.

For simplicity of discussion sake, the signal emission time, $t_e(i)$ is assumed to have been corrected for satellite clock bias, ionosphere and troposphere delays. The tracking loops and data decoder unit 20 also records signal reception time, $t_{rx}$, which is the time when GPS signals are received and sampled by the GPS receiver 10. This signal reception time, $t_{rx}$, is measured by a GPS receiver clock (not shown), which is not synchronized with GPS satellite clocks (GPS time). This receiver clock bias is typically unknown. A pseudorange, pr(i) for each satellite SVi, is measured based on a difference between the signal emission time $t_e(i)$ and signal reception times $t_{rx}$, as follows:

$$pr(i)=(t_{rx}-t_e(i)) \cdot c \qquad \text{Equation 1}$$

where c is the speed of light in a vacuum. The pseudorange pr(i) is a distance from GPS receiver 10 to satellite SVi, and is referred to as pseudorange because reception time $t_{rx}$ is not synchronized with emission times $t_e(i)$.

Figure 3:
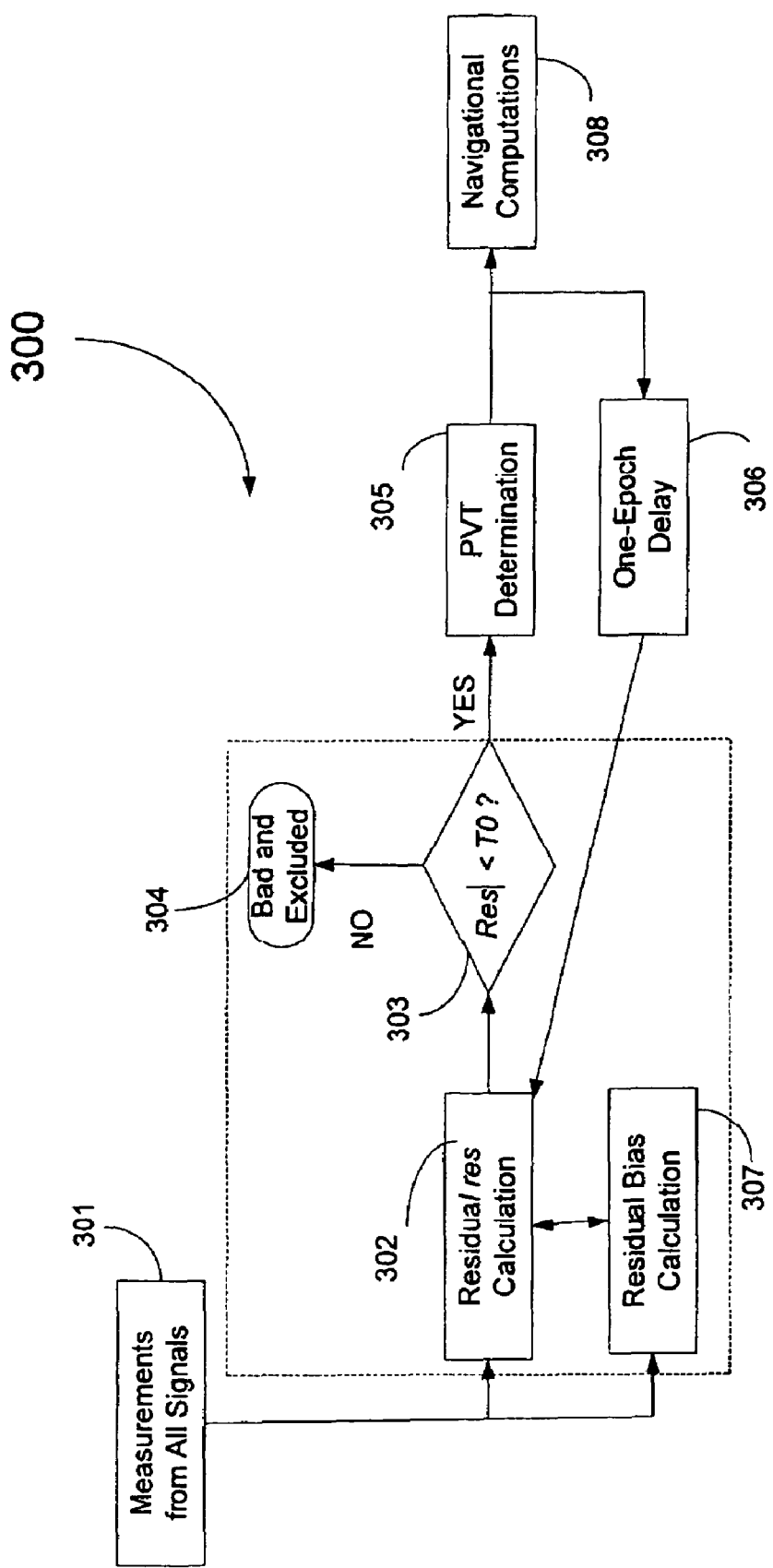
FIG. 3 is a flow chart illustrating a typical method for performing a pre-update pseudorange residual test.

Now referring to FIG. 3, a flow chart 300 is shown illustrating a method for performing a known pre-update pseudorange residual test in the FDE unit 21. Measurements from all N broadcasted signals B(i) are captured by tracking loops and data decoder unit 20 and provided to the FDE unit 21, at step 301. In the FDE unit 21, for each satellite SVi, the pre-update pseudorange residual test calculates a residual, res'(i), by differentiating a predicted range r(i) and the measured pseudorange pr(i), at step 302, as follows:

$$res'(i)=r(i)-pr(i) \qquad \text{Equation 2}$$

where the predicted range, r(i), from each satellite SVi to GPS receiver 10 is computed based on the satellite SVi position which can be calculated from its ephemeris data and the position of GPS receiver 10 which was solved at a prior epoch by the PVT determination unit 305.

Since the pre-update residual test uses the PVT values calculated from the last epoch, residuals res'(i) can have a bias due to the receiver position movement and clock frequency drift during one epoch. Hence, the rest often implements a residual bias calculation at step 307 in order to remove this residual bias. The implementation of this residual bias calculation varies with different receiver design, for example, computing a common residual bias δes by averaging residuals res'(i), as follows:

$$\delta res=(res'(1)+res'(2)+ \ldots +res'(N))/N \qquad \text{Equation 3}$$

Then, this common residual bias δres is removed or subtracted from all residuals res'(i), as follows:

$$res(i)=res'(i)-\delta res \text{ for } i=1, 2, \ldots, N. \qquad \text{Equation 4}$$

At step 303, each residual res(i) is compared to a threshold with a predetermined value, T0. If a magnitude of res(i) is larger than T0, then the corresponding pseudorange measurement pr(i) is detected as a failure and is excluded from the PVT position computations, at step 304. Otherwise, the corresponding pseudorange measurement pr(i) is used to update in the receiver PVT position computations, at step 305. The newly determined PVT values are then used in subsequent GPS navigational computations, at step 308. Meanwhile, the newly determined PVT values are delayed by one epoch, at step 306, to be provided and utilized by the tracking loops and data decoder unit 20 and the FDE unit 21 at next epoch.

The pre-update pseudorange residual test treats all pseudorange measurements, pr(i), equally, which may render it less effective. For example, suppose the signal B(j) tracked on channel j is a failed signal that is to be detected. Since this failed signal B(j) is mistakenly used in the estimation of the residual bias, δres, the current residual test algorithm results in not only a less severe failure in pr(i), but also less nominal residuals for other signals. Similarly, other approaches of the residual bias calculation typically distribute the signal failure to other nominal quantities. Therefore, the residual test may not have a tight residual threshold value in order not to increase the likelihood of erroneously excluding nominal measurements.

Figure 4:
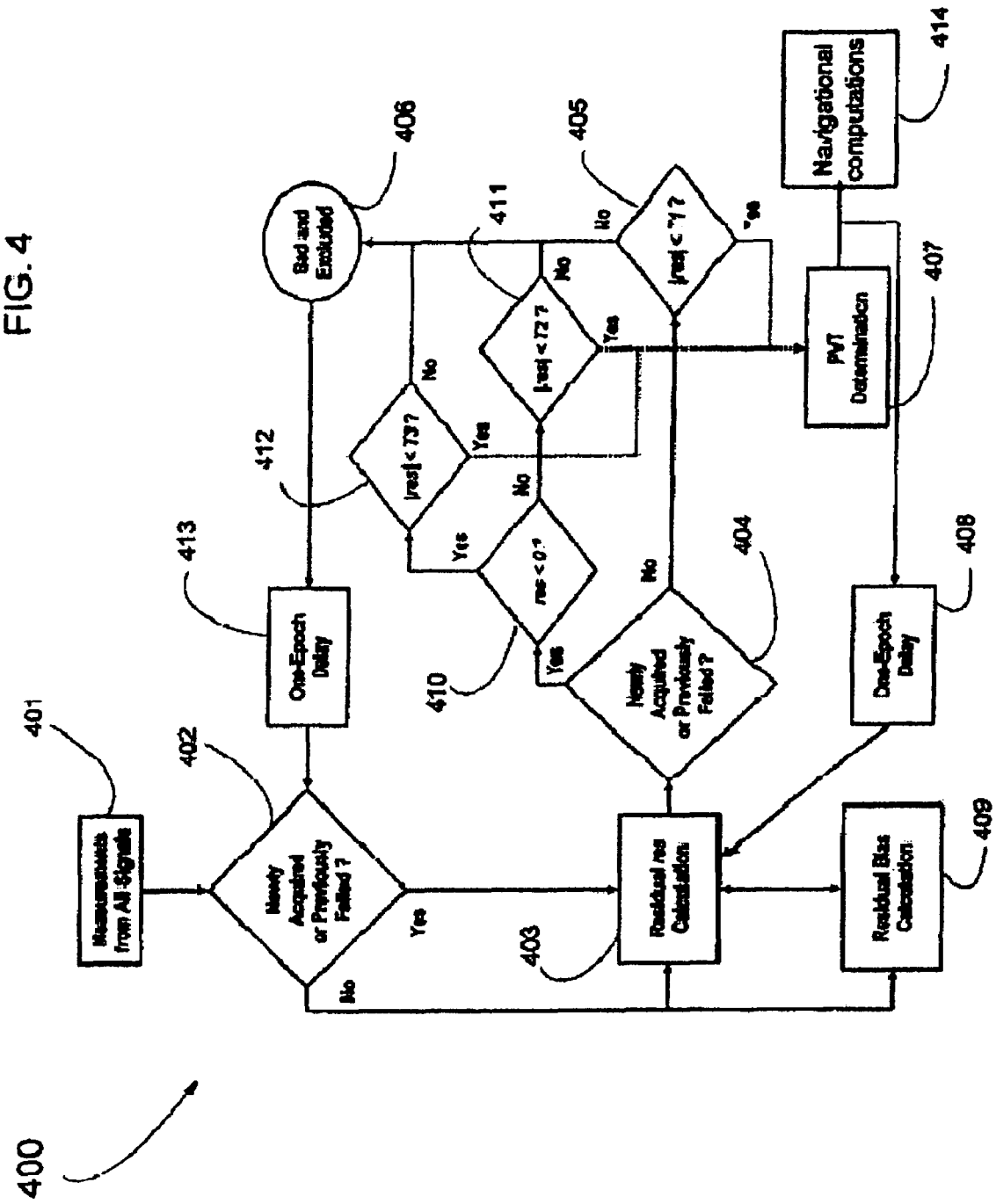
FIG. 4 is a flow chart illustrating a method for performing a pre-update pseudorange residual test in accordance with the present invention.

Now referring to FIG. 4, a flow chart 400 illustrates a method for improving the pre-update pseudorange residual test. At a current epoch, measurements from all N broadcasted signals B(i) are captured by tracking loops and data decoder unit 20 and provided to the FDE unit 21, at step 401. At step 402, a first step of the improved residual test is to separate tracked signals (and their associated measurements) into two groups of tracked signals B(i). A first group is a subset of signals B(i) which had been tracked and whose residual measurements res(i) had passed a threshold test at the last epoch. Range measurements pr(i) in this first group can have a low probability of being failures at the current epoch. A second group is another subset of signals B(i) that are newly acquired or reacquired signals or that were tracked but whose residual measurements res(i) failed to pass the threshold test at the last epoch. Range measurements pr(i) in the second group generally have a higher probability of being failures than that of the first group.

The separation of signals B(i) in a first group and a second group is based on the following facts. Firstly, a failure that occurs to a signal at a current epoch can still persist at next epoch with a fairly high probability. Ephemeris data error can last as long as a new, correct ephemeris is broadcasted. Even temporal multipath can occur with duration of a few seconds or minutes. Secondly, a newly acquired or required signal B(i) is likely to be a chance of introducing a new failure. For example, tracking loops and data decoder unit 20 may need to lose track of direct signals first before locking on multipath signals.

Biased residuals res'(i) are calculated via Equation 2 as discussed above, at step 403. This improved test method, however, calculates the residual bias utilizing only measurements of the first group of signals B(i), which have a relatively lower probability of being failures. As such, instead of using Equation 3, the residual bias δres is evaluated by computing the average of residuals res'(i) corresponding to tracked signals B(i) of the first group only. If the first j signals are in the first group, then δres is evaluated as follows:

$$\delta res=(res'(1)+res'(2)+ \ldots +res'(j))/j \qquad \text{Equation 5}$$

where j is less than or equal to N. Then, the bias δres is removed or subtracted from all res'(i), i=1,2, ..., N, with Equation 4.

This computation serves to prevent potential failures in the second group of signals from corrupting residual calculations corresponding to the first group of signals. With this signal separation and a substantially higher integrity of calculated residuals, the improved residual test can apply a tighter threshold than T0 to test residuals res(i) and detect failures, where T0 is the threshold adopted in the original residual test, discussed above.

As shown in FIG. 4, after the calculation of residuals res(i), the improved residual test needs to determine whether a signal B(i) belongs to the first or second group. If the corresponding calculated residual res(i) corresponds to a signal of the first group, i.e., the signal has passed the residual test at a prior epoch, then the improved residual test uses T1, with T1≦T0, as a threshold value to test res(i) at step 405. A basis for selecting the threshold value T1 to be less than T0 for the same false detection probability is that the calculated residual res(i) have now a higher detection integrity. If the magnitude of the calculated residual res(i) is larger than T1, then the corresponding pseudorange measurement pr(i) is detected as a failure and is excluded from the PVT computations, at step 406. Otherwise, the corresponding pseudorange measurement pr(i) is utilized in the receiver PVT computations, at step 407.

If the calculated residual res(i) corresponds to a signal of the second group, i.e., corresponding signal B(i) has either failed the residual test at a prior epoch or is just acquired (or reacquired), then the improved residual test further determines whether the calculated residual res(i) is less than zero, at step 410. If res(i) is above zero, the improved residual test uses T2, with T2≦T1≦T0, as a threshold value to test res(i), at step 411. Threshold T2 is selected to be less than threshold T1 within the same false detection probability because signals in the second group are more likely to be failures. If the magnitude of the calculated residual res(i) is larger than T2, then the corresponding pseudorange measurement pr(i) is detected as a failure and is excluded from the PVT computations, at step 406. Otherwise, the corresponding pseudorange measurement pr(i) is used in the receiver PVT computations, at step 407.

If step 410 determines that a residual res(i) of a signal in the second group is negative, then the improved residual test uses another smaller or tighter threshold value, T3, with $T3 \leq T2 \leq T1 \leq T0$, to test a magnitude of res(i), at step 412. When signal B(i) is a reflected signal, it travels a longer path to antenna 11 than its direct signal does to reach the GPS receiver 10. As such, the corresponding pseudorange pr(i) may appear longer, and the corresponding residual res(i) may be negative. If the magnitude of the calculated residual res(i) is larger than T3, then the corresponding pseudorange measurement pr(i) is detected as a failure and is excluded from the PVT computations, at step 406. Otherwise, the corresponding pseudorange measurement pr(i) is used in the receiver PVT computations, at step 407.

When a signal failure is detected and excluded, either at step 405, 411 or 412, a corresponding signal index is recorded and delayed by one epoch at step 413. This recorded signal index information may be used to determine whether the tracked signal at next epoch is newly acquired or has previously failed the residual test, at step 402. All tracked signals that pass the residual test are used in the PVT computation at step 407. Accordingly, the computed position value is then delayed by one epoch at step 408, so that next epoch pseudorange residuals pr(i) may be calculated based on this receiver computed position. Thus, the process of the improved residual test can be repeated at every epoch. The updated receiver position is also passed to the navigational computations at step 414.

Figure 5:
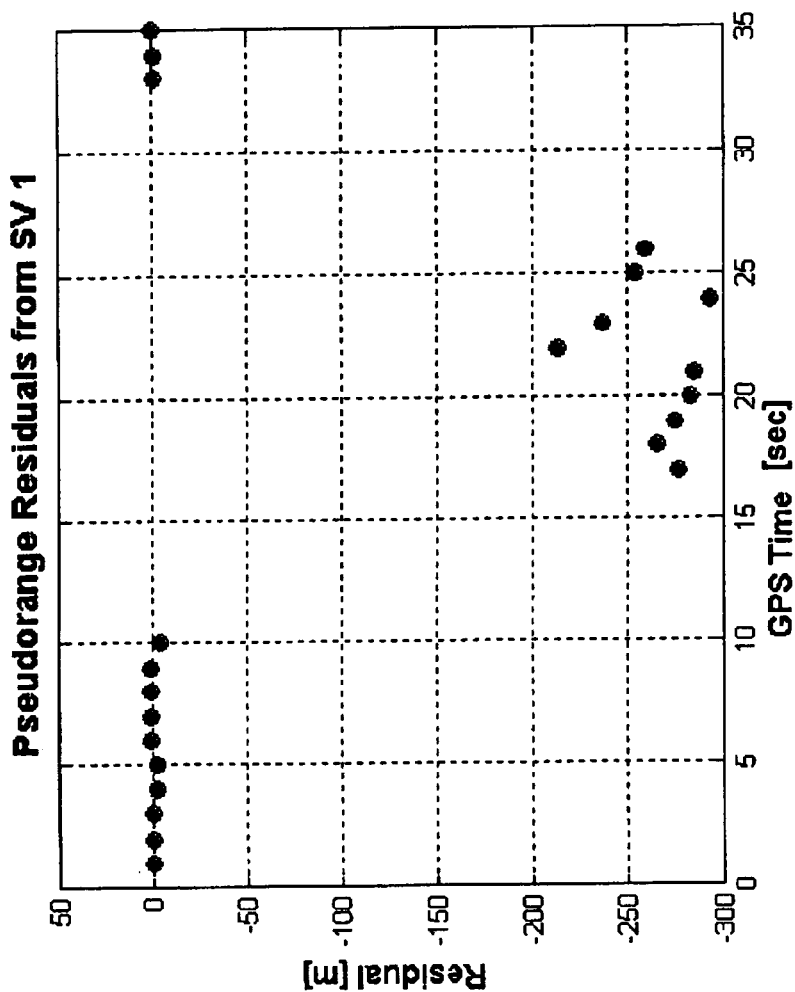
FIG. 5 is graph illustrating pseudorange residuals evaluated for one orbiting satellite.

Now referring to FIG. 5, a graph 500 shows an example of pseudorange residuals from one satellite, say SV1. The GPS receiver 10 lost track of a signal at time 11 seconds. When the GPS receiver 10 reacquired the signal at time 17 seconds, the signal residuals became substantially negative. A reflection of this signal may have been tracked from time 17 to 26 seconds. This graph relates that acquiring new signals or reacquiring lost signals may introduce new failures. Thus, a typical GPS receiver may have to temporarily lose track (i.e., no measurement from a satellite) of a direct signal B(i) before reacquiring its reflected signal. Further, a tracked signal B(i) that was detected as a failure at a prior epoch may continue to be a failure again at the current epoch. Moreover, a reflection signal is likely to have a negative residual. The pre-update residual test is thus improved based on all these above discussed reasons and facts.

The improved residual test puts newly acquired or reacquired signals into the second group. Thus, if a newly acquired signal B(i) turns out to be a direct signal, then this signal B(i) may be selected via this test relatively quickly despite an initial affiliation to the second group of tracked signals. Further, if a false detection occurs, the corresponding good signal B(i) can also relatively quickly pass the pseudorange test and enter the first group of tracked signals. With the tighter thresholds, T1, T2 and T3, than T0, the improved residual test can more successfully detect failures, including reflections, without increasing the false detection probability.

Properly choosing the values for these thresholds is of importance. They can be determined in the same way as T0 is determined. Typically, they are evaluated based mostly on nominal and failure test results. However, even with the worst choice, i.e., $T1=T2=T3=T0$, the improved test method is still better than the original one because of higher integrity of calculated residuals.

If the pseudorange measurement pr(i), either from the second or the first group, fails to pass the residual test at one epoch, it ends up in the second group at the next epoch. Therefore, the improved residual test keeps separating measurements that have a higher probability of being failures from the remaining measurements. In situations, for example, when there is no signal B(i) in the first group, the improved residual test can simply move all signals into the first group and then easily recover back to the original residual test.

The improved residual test does not assume that all signals B(i) in the first group are nominal. If a failed signal B(i) did pass the test at a previous epoch, the proposed test still continuously checks this failed signal's residuals. The improved test even applies a tighter threshold, T1. In some extreme case, if the first group does actually contain some failures which the residual test missed to detect, the residual test may then mistakenly exclude good signals in both groups. If this situation happens, the improved residual test can also move all signals into the first group and recover back to the original residual test. This recovery mechanism can be implemented by monitoring the number of exclusions at every epoch.

The present invention is defined by the appended claims. This description summarizes some aspects of the present embodiments and should not be used to limit the claims.

It is therefore intended that the foregoing detailed description be regarded as illustrative rather than limiting, and that it be understood that it is the following claims, including all equivalents, that are intended to define the spirit and scope of this invention.

The invention claimed is:

1. A method for improving signal fault detection and exclusion of a global positioning system (GPS) receiver, at a current epoch, the method comprising:
   determining pseudorange measurements of a plurality of tracked signals between space vehicles and the GPS receiver;
   predicting range values corresponding to the plurality of tracked signals;
   dividing the plurality of tracked signals into two groups, a first group of signals comprising signals with prior epoch pseudorange measurements used in position, velocity and time (PVT) determinations, a second group of signals comprising signals with prior epoch pseudorange measurements not used in PVT determinations or that are newly acquired;
   evaluating range residuals of tracked signals, the range residuals corresponding to differences between the pseudorange measurements and the predicted range values;
   estimating a residual bias by utilizing the first group signals;
   removing the residual bias from evaluated range residuals;
   comparing each range residual of the first group of tracked signals to a first predetermined threshold value;
   comparing each positive range residual of the second group of tracked signals to a second predetermined threshold value, and comparing a magnitude of each non-positive measurement residual of the second group of tracked signals to a third predetermined threshold value; and
   determining PVT values of the GPS receiver position utilizing range measurements of signals whose corresponding range residual magnitudes are less than corresponding threshold values.

2. The method of claim 1, further comprising:
determining whether each of the plurality of tracked signals is newly acquired or corresponds to a range residual evaluated to be greater than the corresponding threshold value at prior epoch.

3. The method of claim 2, further comprising:
implementing the determined PVT values into navigational computations.

4. The method of claim 1, further comprising:
assigning a first probability to the first group of signals, and a second probability to the second group of signals, with the first probability being less than the second probability.

5. The method of claim 4, wherein the first probability indicates that corresponding signal measurements have a low probability to be excluded from PVT determinations.

6. The method of claim 1, further comprising:
determining that a negative measurement residual corresponds to a reflected signal.

7. The method of claim 1, further comprising:
moving all tracked signals into the first group when the division of all tracked signals renders the first group devoid of signals.

8. The method of claim 1, further comprising:
moving all tracked signals into the first group when the first group includes failed tracked signals.

9. A global positioning system (GPS) receiver system comprising:
a signal tracking and data decoder unit to track time-tagged ranging
signals
broadcasted by space vehicles, and determine pseudorange measurements between the GPS receiver and the space vehicles;
a failure detection unit configured to divide the tracked signals into two groups, a first group comprising signals with prior epoch pseudorange measurements used in position, velocity and time (PVT) determinations, a second group comprising signals with prior epoch range measurements not used in PVT determinations or that are newly acquired, to evaluate range residuals of the tracked signals, the range residuals being a difference between the range measurements and the predicted range values, to estimate a residual bias by utilizing the first group of signals only, to compare each range residual of the first group of tracked signals to a first predetermined threshold value, to compare each positive range residual of the second group of tracked signals to a second predetermined threshold value, and to compare a magnitude of each non-positive range residual of the second group of tracked signals to a third predetermined threshold value; and
a PVT determination unit that uses range measurements of signals whose corresponding range residual magnitudes are less than corresponding threshold values to determine PVT values.

10. The GPS receiver system of claim 9, wherein the failure detection
unit
determines whether each one of the plurality of tracked signals is newly acquired or corresponds to a range residual evaluated to be greater than the corresponding threshold value at prior epoch.

11. The GPS receiver system of claim 9, wherein the failure detection unit assigns a first probability to the first group of signals, and a second probability to the second group of signals, with the first probability being less than the second probability.

12. The GPS receiver system of claim 11, wherein the first probability indicates that corresponding signal measurements have a low probability to be excluded from PVT determinations.

13. The GPS receiver system of claim 9, wherein the failure detection unit determines that a negative range residual corresponds to a reflected signal.

14. The GPS receiver system of claim 9, further comprising:
a navigational unit to determine navigational results using the determined PVT values.

15. The GPS receiver system of claim 9, wherein the failure detection unit moves all tracked signals into the first group when the division of all tracked signals renders the first group devoid of signals.

16. The GPS receiver system of claim 9, wherein the failure detection unit moves all tracked signals into the first group when the first group includes failed tracked signals.

17. A GPS navigational system comprising:
at least one processor;
a memory coupled to the processor, the memory comprising at least tracked signal data, decoding data, range measurement data, predicted range data, threshold data, position, velocity and time (PVT) data, epoch data, and residual data; and
a global positioning program operable to:
determine range measurements of a plurality of tracked signals between corresponding space vehicles and the GPS receiver;
predict range values of the plurality of tracked signals;
divide the plurality of signals into two groups of tracked signals, a first group comprising signals with prior epoch range measurements used in PVT determinations, a second group of signals being signals with prior epoch range measurements not used in PVT determinations or that are newly acquired;
evaluate range residuals of the tracked signals, the range residuals corresponding to differences between the range measurements and the predicted range values;
estimate a residual bias by utilizing the first group of signals;
remove the residual bias from the evaluated range residuals;
compare each positive range residual of the first group of tracked signals to a first predetermined threshold value, compare each positive range residual of the second group of tracked signals to a second predetermined threshold value, and compare a magnitude of each non-positive measurement residual of the second group of tracked signals to a third predetermined threshold value; and
determine PVT values of the GPS receiver position utilizing range measurements of signals whose corresponding range residual magnitudes are less than corresponding threshold values,
wherein the at least one processor executes the global positioning
program.

18. The GPS navigational system of claim 17, wherein the at least one processor determines whether each one of the plurality of tracked signals is newly acquired or corresponds to a range residual evaluated to be greater than the corresponding threshold value at prior epoch.

19. The GPS navigational system of claim 17, wherein the at least one processor assigns a first probability to the first group of signals, and a second probability to the second group of signals, with the first probability being less than the second probability.

20. The GPS navigational system of claim 17, wherein the at least one processor determines that a negative range residual corresponds to a reflected signal.

* * * * *